US008528080B2

(12) United States Patent
McCorkendale et al.

(10) Patent No.: US 8,528,080 B2
(45) Date of Patent: Sep. 3, 2013

(54) SHORT-RANGE MOBILE HONEYPOT FOR SAMPLING AND TRACKING THREATS

(75) Inventors: Bruce McCorkendale, Manhattan Beach, CA (US); John P. Kelly, Seattle, WA (US); Brian Hernacki, San Carlos, CA (US)

(73) Assignee: Reefedge Networks, LLC, Wilmington, DE (US)

( * ) Notice: Subject to any disclaimer, the term of this patent is extended or adjusted under 35 U.S.C. 154(b) by 452 days.

(21) Appl. No.: 12/560,326

(22) Filed: Sep. 15, 2009

(65) Prior Publication Data

US 2013/0091570 A1 Apr. 11, 2013

(51) Int. Cl.
*G06F 11/00* (2006.01)

(52) U.S. Cl.
USPC .............................. 726/22; 726/24

(58) Field of Classification Search
USPC .......................................................... 726/22
See application file for complete search history.

(56) References Cited

U.S. PATENT DOCUMENTS

| 2007/0117593 | A1* | 5/2007 | Izdepski ........................ 455/565 |
| 2008/0046965 | A1* | 2/2008 | Wright et al. ..................... 726/1 |
| 2008/0086776 | A1* | 4/2008 | Tuvell et al. .................... 726/24 |
| 2009/0328209 | A1 | 12/2009 | Nachenberg |

OTHER PUBLICATIONS

NPL "Honeypots—Definitions and Value of Honeypots" (May 29, 2003; snapshot taken Jun. 2, 2003) Lance Spitzner; ; originally converted to PDF from http://www.tracking-hackers.com/papers/honeypots.html via http://www.archive.org/.*

NPL "What are Heuristics?" (Apr. 1, 2009; snapshot taken Apr. 3, 2009) Brett Callow; 3 pages; originally converted to PDF from http://www.brighthub.com/computing/smb-security/articles/1208.aspx via http://www.archive.org/.*

"BlueBat: Towards Practical Bluetooth Honeypots" (Jun. 14-18, 2009) by Antonio Galante, Ary Kokos and Stefano Zanero; 6 pages of IEEE ICC 2009; originally downloaded from http://ieeexplore.ieee.org/stamp/stamp.jsp?arnumber=05198796.*

Egan, G., "Not All Reputation Technologies are Created Equal," Symantec Corporation, Sep. 22, 2009, [Online] [Retrieved on Mar. 30, 2010] Retrieved from the Internet<URL:http://www.symantec.com/connect/blogs/not-all-reputation-technologies-are-created-equal>.

(Continued)

*Primary Examiner* — Carl Colin
*Assistant Examiner* — S. Ali Zaidi
(74) *Attorney, Agent, or Firm* — Fahmi, Sellers, Embert & Davitz

(57) ABSTRACT

Files received by a mobile device are sampled for malware tracking. The method includes configuring file transfer mechanisms that use short-range communication technology on the mobile device to appear, to other devices, to be open for accepting all attempts to transfer files. The method further comprises intercepting files transferred via the short-range communication technology to the mobile device from another device. The method also comprises quarantining the files transferred to the mobile device and logging identifying information about each of the files quarantined and about the other devices from which each of the files originated. The method further includes providing the logged identifying information for the files received to a security server. The method can also include, responsive to a request from the security server for more information about one of the files, providing a copy of that file to the security server for malware analysis and for updating a reputation system tracking mobile device malware.

19 Claims, 6 Drawing Sheets

(56) References Cited

OTHER PUBLICATIONS

"Symantec Releases Decoy-Based Intrusion Detection System," Symantec Corporation, Jul. 1, 2003, 2 pages, [Online] [Retrieved on Mar. 30, 2010] Retrieved from the Internet<URL:http://www.symantec.com/region/au_nz/press/au_030701c.html>.

"TrustedSource™: the Next-Generation Reputation System White Paper," Secure Computing Corporation, Oct. 2006, 6 pages.

Walsh, L., "Careful, Trend Micro Might Give You a Bad Web Reputation," ChannelWeb Network, Mar. 26, 2007, [online] [Retrieved on Jun. 21, 2007] Retrieved from the Internet<URL:http://www.v3.crn.com/security/198500632>.

* cited by examiner

SHORT-RANGE MOBILE HONEYPOT FOR SAMPLING AND TRACKING THREATS

BACKGROUND OF THE INVENTION

1. Field of the Invention

This invention pertains in general to computer security, and more specifically to sampling and tracking computer threats on mobile devices.

2. Description of the Related Art

While computer systems are continually threatened by a risk of attack from malicious computer code, such as viruses, worms, and Trojan horses, there have been only a limited number of malware threats associated with mobile devices (e.g., smart phones, etc.). However, mobile devices are showing an astounding growth in both enterprise and consumer markets. As mobile devices become more prevalent and integrated into everyday commerce, they will become a rich target for cyber crimes.

The computer security industry for detecting and managing malware on computers has become a large and thriving industry, with many new technologies being developed regularly to keep up with the constantly evolving malware. A wide variety of different kinds of antivirus software can be installed on computers to prevent or otherwise manage malicious code attacks. However, there has not yet been developed an effective mechanism for detecting computer threats that spread via short-range communication technologies, such as BLUETOOTH®, infra-red, WiFi, etc. Currently, there is no mobile-specific mechanism for sampling, profiling, and tracking the locality of mobile device threats.

Tracking malware spread via short-range transfer technologies on mobile devices further presents additional challenges not encountered with security management of personal computers (PCs). With a PC, a security software vendor can set up numerous computers around the world that the vendors manage and use to test software and examine potential threats and their actions. Yet, this technique of managing multiple computers for malware testing and tracking cannot be as easily implemented with mobile devices. Many mobile devices run via subscriptions to mobile services offered by mobile service providers. These mobile networks operated by different providers could possibly face threats that are unique to certain networks, to certain devices, certain regions, and so forth. For thorough testing, security software vendors would have to subscribe to a multitude of different services using various devices placed around the world. This mechanism for malware tracking is not tenable in the same manner that it is with PCs, making malware tracking for short-range mobile devices a unique problem.

Therefore, there is a need in the art for a solution that samples, profiles, and tracks malware transferred via short-range technologies on mobile devices of real users.

DISCLOSURE OF INVENTION

The above and other needs are met by a computer-implemented method, computer system, and computer-readable storage medium in which a security module samples files for malware tracking on a mobile device. Embodiments of the computer-implemented method comprise configuring file transfer mechanisms that use short-range communication technology on the mobile device to appear, to other devices, to be open for accepting all attempts to transfer files. The method further comprises intercepting files transferred via the short-range communication technology to the mobile device from another device. The method also comprises quarantining the files transferred to the mobile device and logging identifying information about each of the files quarantined and about the other devices from which each of the files originated. The method further includes providing the logged identifying information for the files received to a security server for malware tracking. In some embodiments, the method also includes, responsive to a request from the security server for more information about one of the files, providing a copy of that file to the security server for malware analysis.

Embodiments of the computer-readable storage medium store executable computer program instructions for sampling files for malware tracking on a mobile device, the instructions comprising instructions for performing steps including configuring file transfer mechanisms that use short-range communication technology on the mobile device to appear, to other devices, to be open for accepting all attempts to transfer files. The instructions further comprise instructions for intercepting files transferred via the short-range communication technology to the mobile device from another device. The instructions also comprise instructions for quarantining the files transferred to the mobile device and logging identifying information about each of the files quarantined and about the other devices from which each of the files originated. In addition, the instructions comprise instructions for providing the logged identifying information for the files received to a security server for malware tracking. In some embodiments, the instructions also comprise instructions for, responsive to a request from the security server for more information about one of the files, providing a copy of that file to the security server for malware analysis.

Embodiments of another computer-implemented method for sampling files for malware tracking on a mobile device comprise deploying sampling modules to each of a number of mobile devices having file transfer mechanisms that use short-range communication technology, where the file transfer mechanisms of the mobile devices are configured by the sampling modules to appear, to other devices, to be open for accepting all attempts to transfer files. The method also includes periodically receiving, from the sampling modules, logged identifying information about each of a plurality of files intercepted and quarantined by the sampling modules and about the other devices from which each of the files originated. The method further includes requesting, from the sampling modules, copies of certain of the files for which logged information was received. In addition, the method comprises analyzing each of the received copies to identify the files that contain malware. Further, in some embodiments, the method includes updating a reputation system for tracking mobile device malware regarding the files identified to contain malware.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
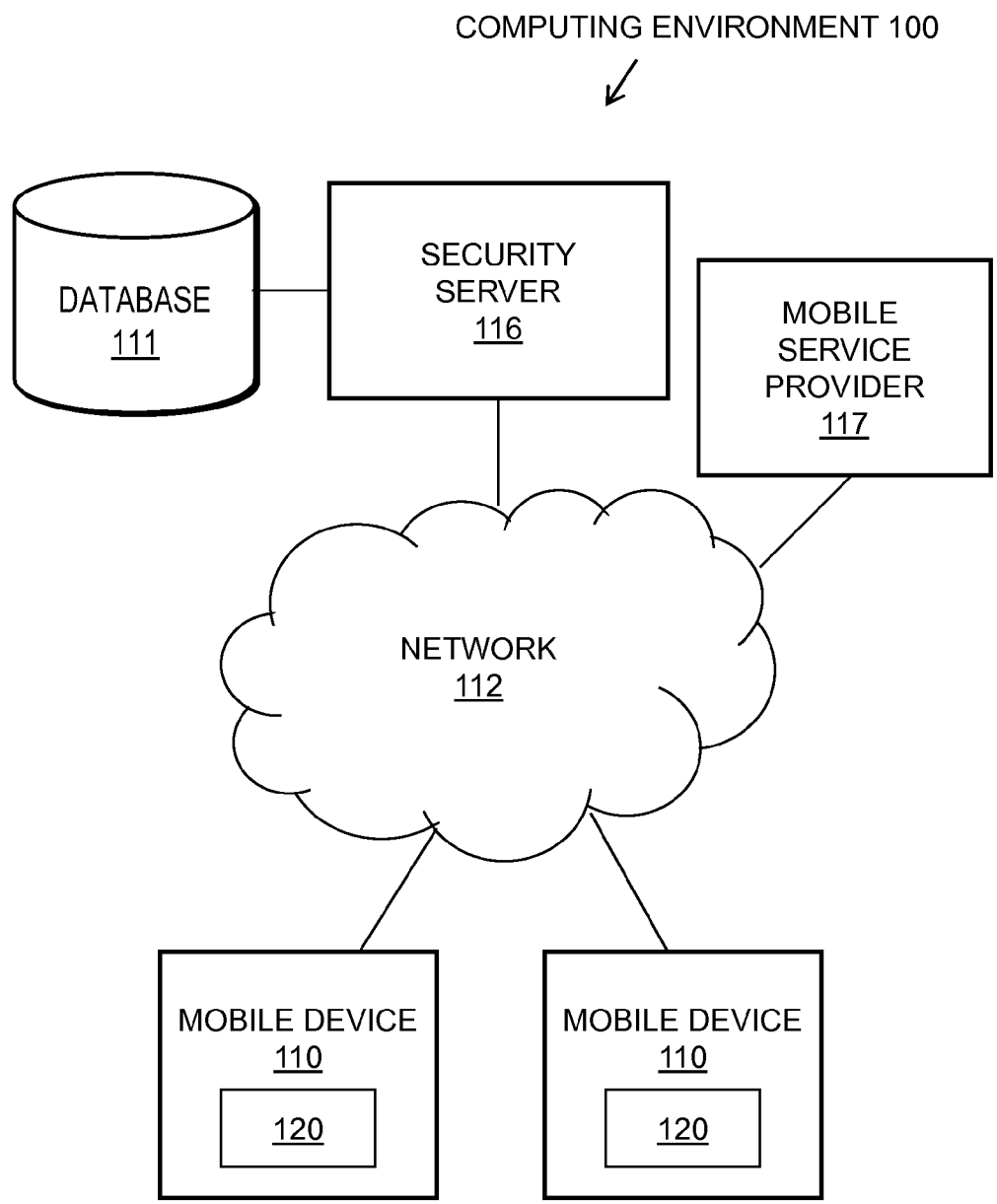
FIG. 1 is a high-level block diagram illustrating an example of a computing environment 100, according to one embodiment of the present invention.

FIG. 1 is a high-level block diagram illustrating a computing environment 100 according to an embodiment. FIG. 1 illustrates a security server 116, a mobile service provider 117, and mobile devices 110 connected by a network 112. Only two mobile devices 110 are shown in FIG. 1 in order to simplify and clarify the description. Embodiments of the computing environment 100 can have thousands or millions of mobile devices 110, as well as multiple servers 116 or mobile service providers 117. In some embodiments, the mobile devices 110 are only connected to the network 112 for a certain period of time or not at all.

The security server 116 serves information or content to mobile devices 110 via the network 112. In one embodiment, the server 116 is located at a website provided by SYMANTEC CORPORATION, although the server 116 can also be provided by another entity. The server 116 can include a database 111 for storing information regarding mobile applications and a web server for interacting with mobile devices 110. The server 116 can send/receive information across the network 112 and to the mobile devices 110 or the mobile service provider 117. For example, the server 116 can receive, from a mobile device 110, samples of files received by the mobile device 110, and can conduct a malware analysis of these files. As used herein, "malware" or "malicious code" is any code that enters a device without an authorized user's knowledge and/or without an authorized user's consent with the intention of conducting malicious activities on that device or on other devices. One or more of the functions of the server 116 can also be executed on the mobile device 110 or in a cloud computing environment. As used herein, "cloud computing" or the "cloud" refers to a style of computing in which dynamically scalable and often virtualized resources are provided as a service over the Internet. For example, a reputation system with which the server 116 interacts regarding reputation data for an application might be operated on the cloud.

The mobile service provider 117 is an entity that provides mobile service to the mobile devices 110. For example, where the mobile devices are cell phones or smart phones, the mobile service provider 117 can be one that provides services wirelessly via a cellular network (e.g., VERIZON WIRELESS, AT&T, T-MOBILE, etc.). In some embodiments, the service is a subscription service provided to the mobile devices 110 for a fee.

The mobile devices 110 are computers or other electronic devices that can interact with the server 116, the mobile service provider 117, or other mobile devices 110. As used herein, a "mobile device" is a computing device designed for mobility that typically has a display, a keyboard, a pointing device, and many other features of a desktop computer, and can communicate wirelessly with the server 116, including portable computers designed to be moved from one place to another. Examples of "mobile devices" include laptops, notebooks, netbooks, smartbooks, ultra-mobile PCs (UMPCs), and handheld devices (as defined below). In some embodiments, the mobile device is a "handheld device." As used herein, a "handheld device" is a pocket-sized computing device or a device that is sized to be held in the palm of your hand (palmtop device), typically having a display screen with touch input or a miniature keyboard, excluding laptops that are not handheld or palm-sized devices, but including devices such as smartphones, personal digital assistants (PDAs), cell phones or mobile phones, handheld portable media players, handheld game consoles, handheld PCs, handheld UMPCs, and other palm-sized devices.

Many mobile devices 110 can execute a web browser that allows the user to browse and search for information available at a website associated with the server 116. The mobile devices 110 can be network-capable devices, and many mobile devices execute an operating system (e.g., LINUX®, one of the versions of MICROSOFT WINDOWS®, and PALM OS®, which controls the operation of the computer system, and executes one or more application programs. Many mobile devices 110 are also capable of communicating using "short-range communication technologies," which as used herein, refers to communication between two mobile devices 110, typically wirelessly, that are in the same area or are in proximity to each other, though they may not be within the line of sight of each other, including Wi-Fi (IEEE 802.11-wireless LAN (WLAN), BLUETOOTH®, infrared (IR), etc. The distance between devices 110 that allows for short-range communication between the devices 110 can differ for different technologies (e.g., 30 feet or less, or 300 feet or less, for BLUETOOTH® depending on device class, 10 feet or less for IR, 150 feet or less for WiFi indoors, 300 feet or less for WiFi outdoors, and so forth). The mobile devices 110 can perform activities and make requests for or otherwise acquire information from the server 116 or other computers.

The network 112 enables communications among the entities connected to it. In one embodiment, the network 112 is the Internet and uses standard communications technologies and/or protocols. Thus, the network 112 can include links using technologies such as Ethernet, 802.11, worldwide interoperability for microwave access (WiMAX), cellular or cell phone networks, 3G, digital subscriber line (DSL), asynchronous transfer mode (ATM), InfiniBand, PCI Express Advanced Switching, etc. Similarly, the networking protocols used on the network 116 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 112 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

In the embodiment illustrated in FIG. 1, the mobile devices 110 execute a sampling module 120 for sampling files for malware tracking on a mobile device. The sampling module 120 can be a discrete application program, or the module 120 can be integrated into another application program or the mobile device's 110 operating system. In some embodiments, a portion of the sampling module 120 is executed on the server 116 or in a cloud computing environment. In brief summary, the sampling module 120 takes over and configures the file transfer mechanisms on the mobile device to appear to be wide open for accepting all attempts to transfer files by other devices. The module 120 intercepts and quarantines files transferred via short-range communication technologies to the mobile device from another device. The module 120 logs identifying information (e.g., a file hash, the physical location from which the file originated, etc.) about each file and identifying information (e.g., network medium, peer identifiers, etc.) about the other device that sent the file, and provides this information to the security server 116. In response to a request from the server 116 for more information about one of the files, the module 120 provides a copy of that file to the server for malware analysis and for updating a reputation system tracking mobile device malware. The mobile device 110 thus acts as a "honeypot," or a trap set to detect attempts at unauthorized file transfers to the mobile device 110, where the mobile device 110 appears to be open to file transfers on the network 112, but the files received are actually isolated and sent to the server 116 for monitoring and analysis. The analysis results can be used to seed and collect data for a reputation system for mobile malware and for tracking geographic distribution patterns of mobile malware.

Figure 2:
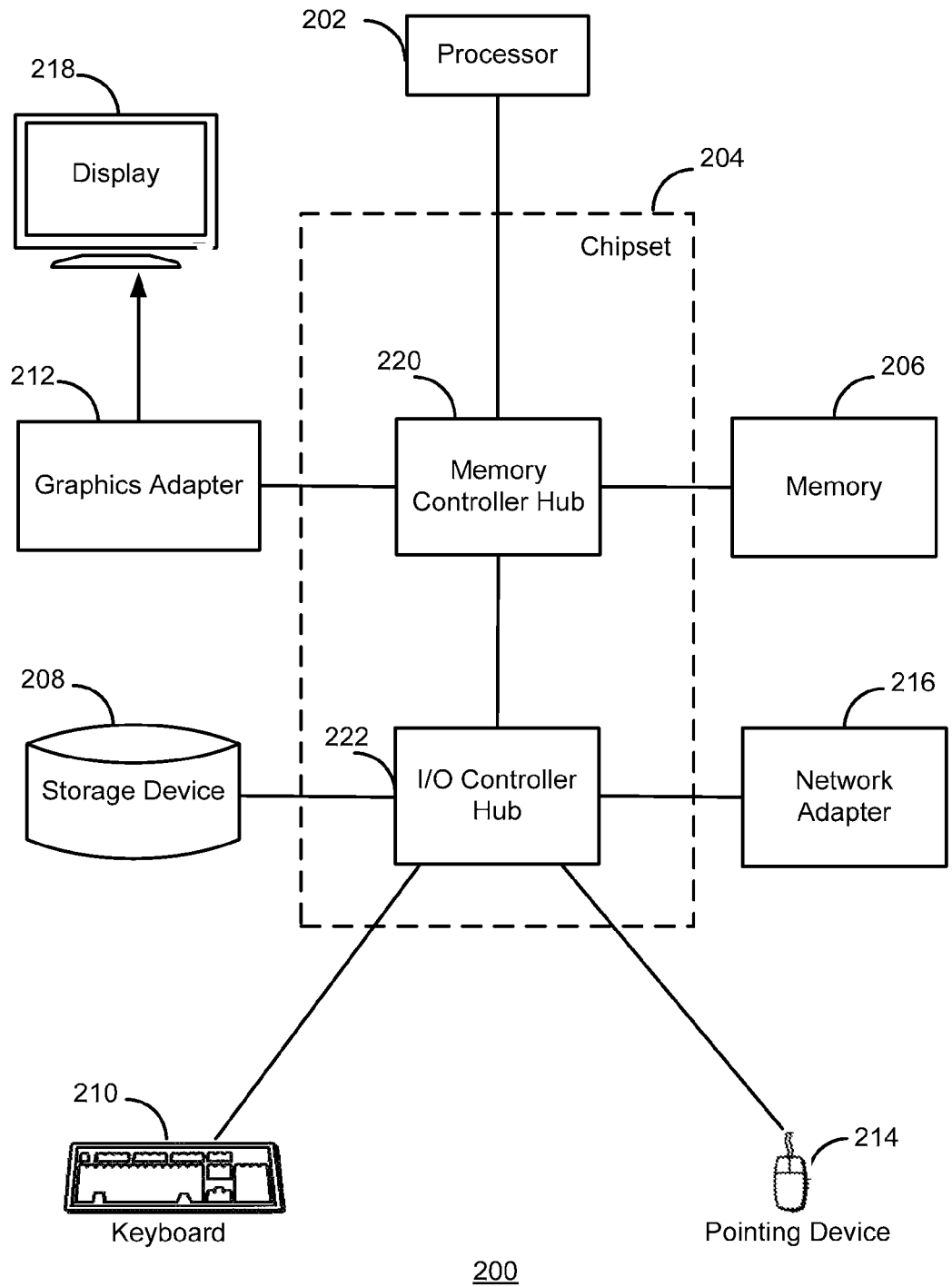
FIG. 2 is a high-level block diagram illustrating a computer system 200 for use with the present invention.

FIG. 2 is a high-level block diagram illustrating an example of a computer 200 for use as a server 116 and/or mobile device 110. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 112. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, certain mobile devices 110, including handheld devices, typically have limited processing power, a small display 218, and could lack a pointing device 214. The server 116, in contrast, may comprise multiple blade servers working together to provide the functionality described herein.

Figure 3A:
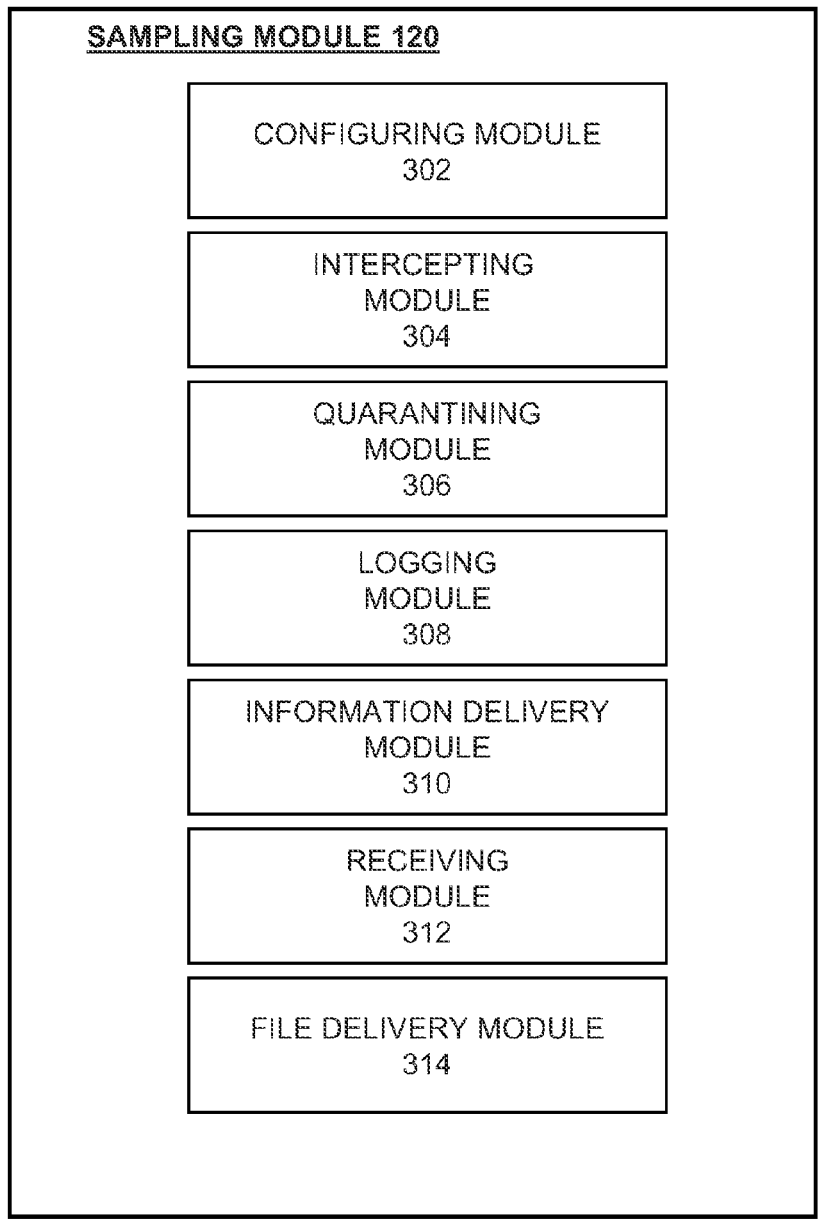
FIG. 3a is a high-level block diagram illustrating the functional modules within the sampling module 120, according to one embodiment of the present invention.

FIG. 3a is a high-level block diagram illustrating the functional modules within the sampling module 120, according to one embodiment of the present invention. The sampling module 120, in the embodiment illustrated in FIG. 3a, includes a configuring module 302, an intercepting module 304, a quarantining module 306, a logging module 308, an information delivery module 310, a receiving module 312, and a file delivery module 314. Some embodiments of the sampling module 120 have different and/or additional modules than those shown in FIG. 3a and the other figures. Likewise, the functionalities can be distributed among the modules in a manner different than described herein. Certain modules and functions can be incorporated into other modules of the sampling module 120 and/or other entities on the network 112, including the server 116.

The configuring module 302 configures file transfer mechanisms that use short-range communication technology on the mobile device 110 to appear, to other devices, to be open for accepting all attempts to transfer files. The module 302 can take over the various file exchange technologies available, and then enable these to accept all files transferred. Normally, on most mobile devices 110, a user would not configure the file transfer mechanisms, like FTP, BLUETOOTH®, IR, or even WiFi, to automatically accept file transfers so that the device default is to be wide open for receiving any file sent without user approval or acknowledgement. However, the configuring module 302 takes control of these mechanisms on the mobile device 110 and makes them appear to be open to other devices on the network 112, including to an attacker who may be browsing the network 112 and discovers the device 110. In this manner, the module 302 makes the device 110 appear attractive to the attacker (a honeypot) as one to which the attacker can send malware.

The intercepting module 304 intercepts files transferred via the short-range communication technology to the mobile device 110 from another device. While the file transfer mechanisms are configured to be open by module 302, in reality the files are actually captured by the module 304 and safely contained for analysis. The sampling module 120 is the sole proprietor of the functionality that is turned on to allow the files to be freely accepted by the device 110, and so these files are captured by the intercepting module 304 and thus prevented from doing damage to the device 110. In one embodiment, the module 304 actually notifies the operating system (OS) of the mobile device 110 that the file transfer mechanisms are turned off or are otherwise positioned to a default setting that prevents free exchange of files without user approval or involvement. In reality, the module 304 is utilizing certain components of the OS (e.g., components for short-range file exchange) to receive and intercept files. In another embodiment, the module 304 could also intercept or modify the OS's presentation mechanism to the user to indicate that it is protected or is locked (e.g., not able to receive files freely), when in actuality it is unlocked, but being controlled by the sampling module 120.

The quarantining module 306 quarantines the files transferred to the mobile device 110. For example, the module 306 can move the file to a special directory, folder, or other safe storage location that is controlled by the module 306. In its quarantine location, the file will not be able to execute and it is typically inaccessible to other programs on the device 110. Thus, if it is malware, the malware will be unable to conduct malicious activities and will be unable to spread. The file can remain in quarantine until the file is determined to be either be malware (that should be deleted or otherwise managed) or non-malware (that can be removed from quarantine and permitted to execute or otherwise be used on the device 110).

The logging module 308 logs identifying information about each of the files quarantined and about the other devices from which each of the files originated. The module 308 can log various types of identifying information. In one embodiment, the module 308 logs the name of the file, the date and time that the file was received, a cryptographic hash (or signature or checksum) of the file, the file version, and so forth. The module 308 can log data about the physical location from which the file was obtained, if available (e.g., using GPS, cellular triangulation, or other location determination technologies). The module 308 can further log any information that is available about the remote origin of the file, or the other device from which the file was received, including the device type (e.g., smartphone, portable media player, etc.), the device make or manufacturer (e.g., BLACKBERRY®, iPHONE®, PALM TREO, etc.), the mobile service provider 117 (e.g., VERIZON WIRELESS, etc.), an identification of ports on the other device that are open for sharing files, and so forth. Similarly, the module 308 can log information about the network medium used to send the file (e.g., BLUETOOTH®, WiFi, GSM, IR, etc.), and one or more peer identifiers associated with the file (e.g., the IP address, the BLUETOOTH® name, etc.). When files are received, the mobile device 110 can also record information about itself or make note of its own configuration, including its security posture or configuration (e.g., the firewall configuration, a list of interfaces that are active on the mobile device 110, the visibility of the mobile device 110 on the network, etc.). In addition, the module 308 can emulate the mobile device 110 and respond to an information gathering request from one of the other devices 110 (e.g., a device that sent a file). By responding to the request for information from another device sending a file, the module 308 can further make the mobile device 110 appear to be active and open for accepting file transfers to potential attackers.

The logging module 308 can record these various types of information passively, but can also take a more active role in acquiring information about the senders of various files. For example, the module 308 can actively counter scan each of the other devices from which the files originated to acquire identifying information about those other devices. The module 308 can probe to gather information about the attacking device or about all devices nearby. This active counter scanning can be conducted in a manner similar to the way an attacker would probe for data, including sending out probes to elicit responses from nearby devices, and then using the information obtained in a nearby response to figure out what kind of device the response came from, what security software it is running, what versions it is running, what ports or capabilities are open for sharing, and so forth. Once someone pings the device 110, the module 308 can ping them back and fingerprint them. Similarly, the module 308 can periodically do a probe of the environment and log what other devices are encountered by the mobile device 110 (e.g., noting that the environment includes three open BLUETOOTH® connections, a WiFi hotspot, an IR ping, etc.). This information could be used, for example, in a crowded room where the module 308 is more likely to find an attacker, and can be used to correlate between the number of active connections available around the mobile device 110 and the likelihood that the device 110 will receive malware or become infected.

The information delivery module 310 provides the logged identifying information for the files received to the security server 116. The identifying information sent can vary from one send to the next, and the rate at which the information is provided can vary. In one embodiment, the module 310 periodically does a batch upload of logged information to the server 116. For example, the module 310 can periodically send hashes of all files received to the server 116 for the server to process in batches. By sending information in batches, the module 310 can minimize the impact on the mobile device 110 and process the information at convenient times that will be less likely to drain the device battery or interrupt the user. For example, the information collection and/or the checking in or providing information to the server 116 can be limited to times when the device 110 is not in use or not being interacted with by the user (i.e., when the device is sitting idle) or when it is charging (e.g., to avoid battery drainage by the module 120). Similarly, the actions could be limited to times of day when the device is not likely being used (e.g., from 2 a.m. to 4 a.m.) or when bandwidth is at a lower cost (e.g., nights and weekends). In addition, the module 310 can take actions to avoid creating a lot of additional charges (e.g., for cell phone data plans, etc.). For example, the module 310 can wait until the user synchronizes the mobile device 110 with his computer to send data to the server 116, and so can send the data using the computer connection to avoid mobile data charges. Similarly, the module 310 can credit money back to the user, can make other security services free in exchange for running this system, or can work with mobile service providers 117 to avoid or minimize charges to users in exchange for the security services offered, among other options.

The receiving module 312 can receive a request from the security server 116 for more information about one or more of the files. Specifically, the server 116 might request copies of files that the security server has not seen before or that are not already known by the server 116 to be good or clean, non-malware files. In some cases, the file may be known already by the server 116 to be a bad or malware file, so the server 116 does not need, and will not request, a copy. In some embodiments, the response from the server 116 triggers an upload of certain or all of the samples received files for analysis on the back end. In some embodiments, the module 312 receives an indication from the server 116 when no copies of files are needed (e.g., they have all been seen before by the server 116 or are not known to be good, non-malware files). Similarly, the server 116 can send no response indicating that no copies of files are needed.

The file delivery module 314 can provide a copy of the requested file(s) to the security server 116 for malware analysis and/or for updating a reputation system tracking malware on mobile devices. The file delivery module 314 provides the copies of the files to the security server 116 for the server to analyze and conduct malware testing. The file delivery module 314 minimizes the impact on the user/device 110 of the sending of the whole file by only sending the file when requested. Thus, initially, only identifying information (e.g., a hash) for the file is sent (by the information delivery module 314), and the entire file is sent only when requested by the server 116. In addition, the copy of the file only needs to be sent once to the server 116, and the server can store data about that file to avoid having to request another copy of the file.

The sampling module 120 and its components described above are designed for sampling files on mobile devices of actual users. Rather than being on a machine controlled by a security software vendor used specifically for trapping malware, as honeypots for PCs often are, the device 110 is an actual mobile device 110 operated by a user in the real world that is used for standard mobile functions in real world locations. In other words, with a PC honeypot, a security vendor can just set up 50,000 PCs across the world, and can control these PCs and have them receive and open suspicious files to watch what those files do in a safe environment. However, with mobile devices 110, a security vendor would have to set up devices, subscribe to 50,000 lines, and make these available at various locations around the world (since the testing is typically proximity-based) for malware sampling/trapping, which is not tenable in the same way that it is with a PC. Thus, instead, the sampling module 120 is deployed to a real user's mobile device 110 and it uses that device 110 to gather information without negatively affecting the user.

Figure 3B:
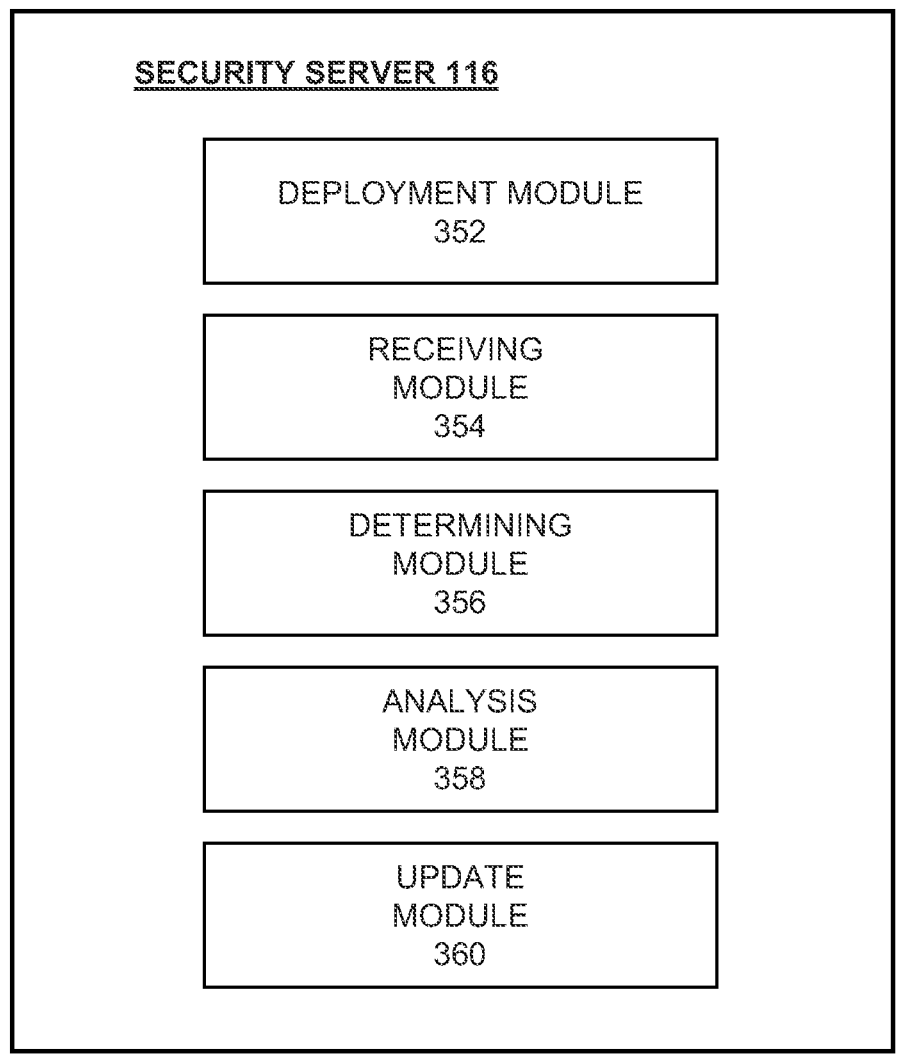
FIG. 3b is a high-level block diagram illustrating the functional modules within the security server 116, according to one embodiment of the present invention.

FIG. 3b is a high-level block diagram illustrating the functional modules within the security server 116, according to one embodiment of the present invention. The security server 116, in the embodiment illustrated in FIG. 3b, includes a deployment module 352, a receiving module 354, a determining module 356, an analysis module 358, and an update module 360.

The deployment module 352 deploys the sampling module 120 to each of various mobile devices 110. The sampling modules 120 can be deployed to all mobile devices 110, or to all devices in certain regions, all devices of a particular type, for certain mobile service providers 117, etc.

The receiving module 354 periodically receives from the sampling module 120 logged identifying information about files intercepted and quarantined by the module 120, where the files were transferred to the device 110 from another device via file transfer mechanisms using short-range communication technology. Based on this information, the server 116 can determine what files have been received by the mobile device 110.

The determining module 356 determines whether any of the files for which identifying information was received have been seen before or are known to be non-malware. In response to determining that certain of the files have not been before or are not known to be non-malware, the module 356 requests copies of those certain files for further analysis. The receiving module 354 described above can receive from the sampling module 120 the copies of the certain files requested.

The analysis module 358 analyzes the certain files to determine whether the certain files are malware. In one embodiment, the module 358 performs the analysis by executing the applications in an emulator or on a virtual machine to observe the behaviors of the file and see if it displays malware characteristics, such as attempting to damage the machine, trying to access and/or send out personal information, etc. For example, the server 116 can make goat files (i.e., sacrificial or dummy files used to test a file suspected to be malicious) available to the file to see if the file attacks the goat file or otherwise conducts suspicious behaviors regarding the goat file. If the file tries to acquire certain personal information, such as contacts or credit card data made available in the goat file, the file is taking actions that are typical of malware. In addition, the server 116 can observe the actions of the file to see if it tries to install a Trojan horse or other malicious program. Similarly, if the file is regularly contacting an outside computer (e.g., a botnet or command control system) or is trying to upload data or send out personal information to such a computer, the file is more likely to be malware. In addition to the analysis conducted via the emulators or virtual machines, manual analysis can also be used if needed to make a final determination regarding whether or not the file is malicious.

The update module 360 can update a reputation system for mobile devices 110 to identify the certain files to be malware for use in future malware detections. The module 360 can provide the results of the analysis to the reputation system for updating a reputation of the file. The reputation information can be stored in a database such as database 111 in FIG. 1. The reputation can be updated in terms of whether or not the file is malware, what its characteristic activities are, and other identifying information for the file. This reputation data collected can be used to seed a mobile device reputation system for tracking mobile malware. As used herein, the term "reputation" represents an assessment of the likelihood that an activity performed by an application is malicious (e.g., is a computer-related threat). An activity that is believed to be malicious will have a poorer reputation than an activity that is not likely malicious. Files that are present on a lot of mobile devices 110 and that have been there for a long time are likely good (or less likely to be malicious). Files that are rarely seen or are only seen on devices 110 that have problems are likely bad or malicious. Further, since the sampling module 120 collects data regarding transfer of files via short-range communication technologies where proximity of the devices 110 is a factor, a file that is transferred through a short-range mechanism without getting user approval is more likely malicious.

The update module 360 can also update the reputation system regarding geographic information and other factors associated with the mobile malware detection for tracking geographic patterns or other patterns of mobile malware distribution. As explained above, the sampling module 120 can gather location data regarding the mobile device (e.g., using GPS or cellular triangulation data), which can be used for the geographic pattern-tracking For example, certain malware may be customized for given regions (e.g., Korea or North Dakota), or types of locations (e.g., malls, banks, coffee shops, etc.). As another example, virus outbreaks could start in certain geographies, at certain times of day (e.g., in the morning), with certain device types (e.g., BLACKBERRY® devices), with certain mobile service providers 117, for certain user demographics, etc. In addition, people in different parts of the world may use their devices differently than others or may use certain mobile features differently. For example, users in some countries may commonly leave BLUETOOTH® turned on, while users in other countries usually leave it turned off. The data collected by the sampling module 120 and analyzed by the analysis module 358 can be used to make correlations between the mobile malware and any of these various factors to look for possible patterns. Further, file transfers between devices 110 via short-range communication technologies are proximity-based transfers, making it easier to correlate a malware file transfer with a particular location of the attacker. This information can then be used in the future to more quickly detect and manage mobile malware.

The update module 360 of the server 116 can also use the mobile malware data collected, in combination with the location awareness or the other factors above, for more effective malware detection and management. For example, this data can be used in customizing heuristics for detecting mobile malware, for creating mobile malware signature updates, for developing security policies applied for malware management, for customizing responses to malware, for reputation formulae used to track malware on mobile devices, and so forth.

Figure 4:
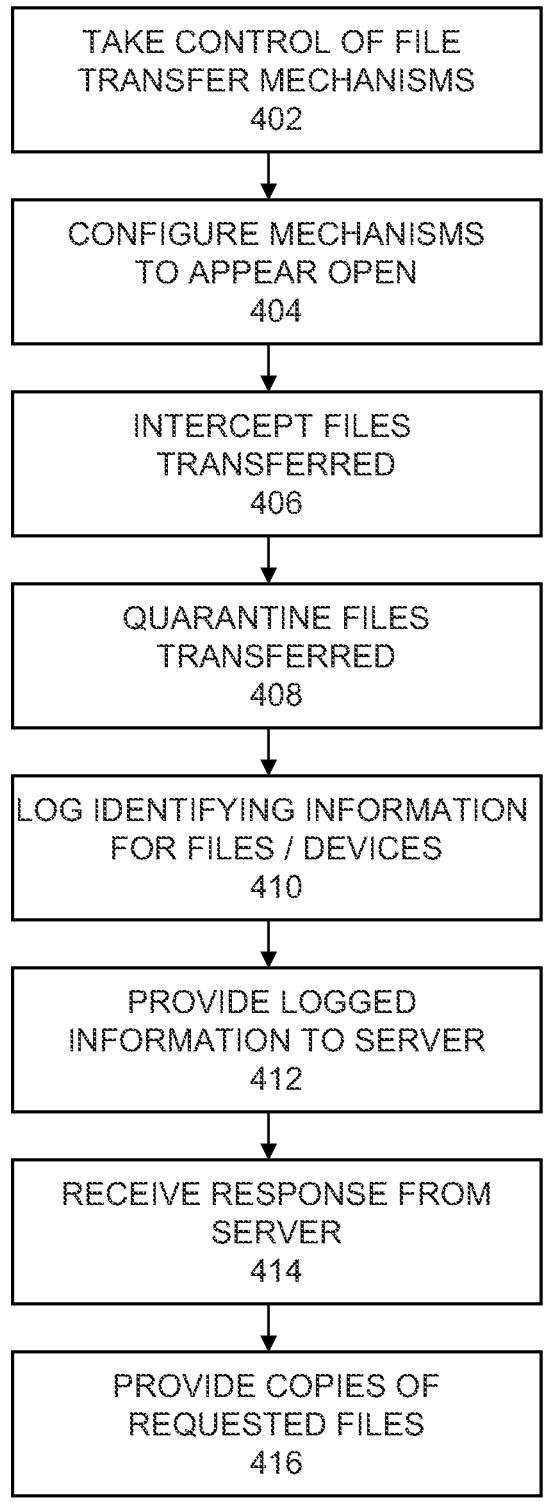
FIG. 4 is a flowchart illustrating steps performed by the sampling module 120, according to one embodiment of the present invention.

Referring now to FIG. 4, there is shown a flowchart illustrating the operation of the sampling module 120, according to some embodiments of the present invention. It should be understood that these steps are illustrative only. Different embodiments of the sampling module 120 may perform the illustrated steps in different orders, omit certain steps, and/or perform additional steps not shown in FIG. 4 (the same is true for FIG. 5).

As shown in FIG. 4, the sampling module 120 takes 402 control of and configures 404 file transfer mechanisms that use short-range communication technology on the mobile device to appear, to other devices, to be open for accepting all attempts to transfer files. The module 120 intercepts 406 files transferred via the short-range communication technology to the mobile device 110 from another device and quarantines 408 the files transferred to the mobile device 110. The module 120 logs 410 identifying information about each of the files quarantined and about the other devices from which each of the files originated. The module 120 provides 412 the logged identifying information for the files received to a security server 116. In some embodiments, the module 120 receives 414 a response from the server 116 regarding the information sent in which the server 116 requests samples of or more information about certain of the files (e.g., files that the server 116 has not seen before or that are not known by the server 116 to be non-malicious files). The module 120 can further provide 416 copies of the requested file(s) to the security server 116 for malware analysis and for updating a reputation system tracking malware on mobile devices.

Figure 5:
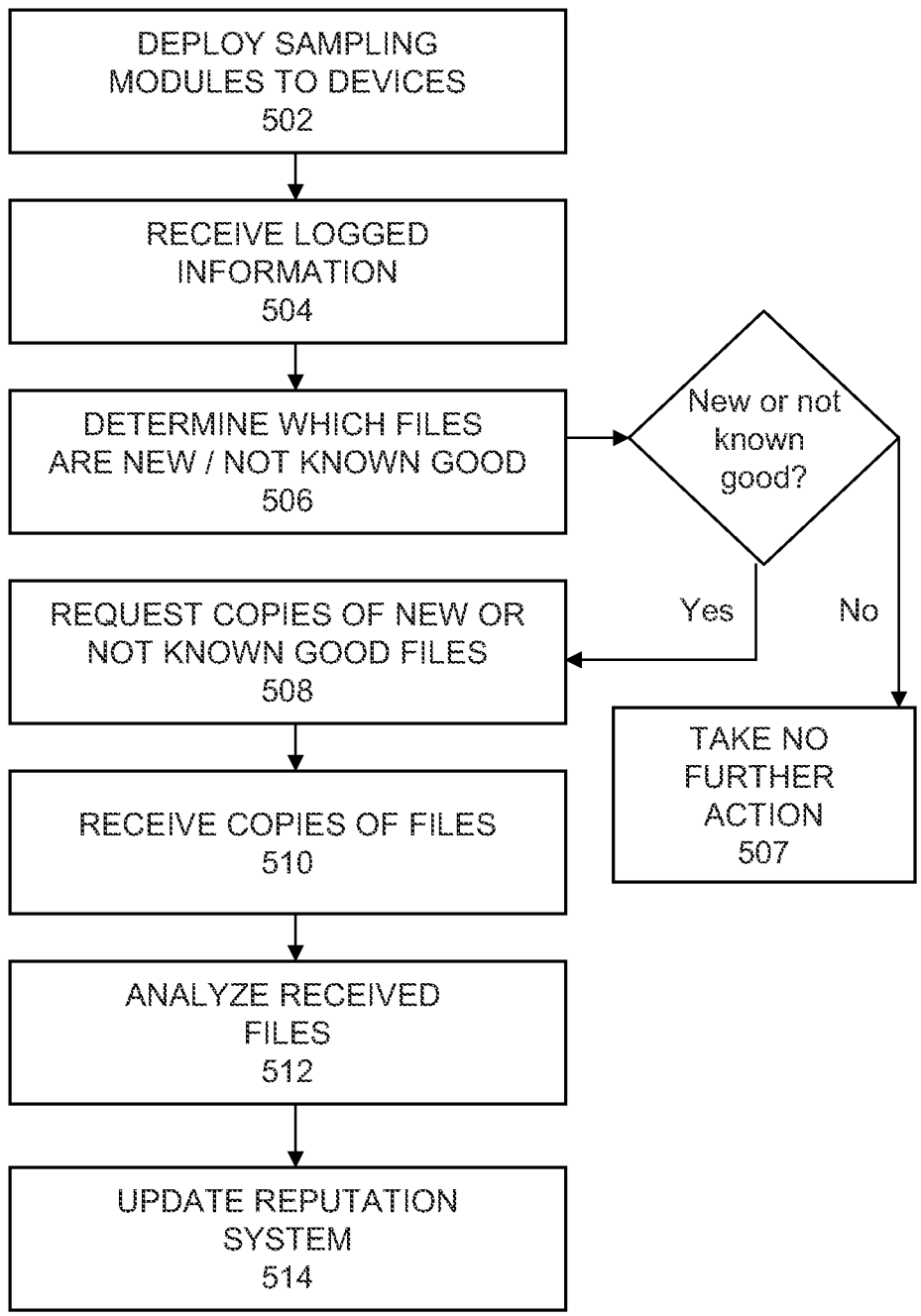
FIG. 5 is a flowchart illustrating steps performed by the security server 116, according to one embodiment of the present invention.

Referring now to FIG. 5, there is shown a flowchart illustrating the operation of the security server 116, according to some embodiments of the present invention. In some embodiments, the server 116 deploys 502 the sampling module 120 to mobile devices 110 (i.e., devices to which a sampling module 120 has not already been deployed). The server 116 can deploy 502 the module 120 to certain mobile devices requiring attention or in certain regions. The server 116 can also deploy 502 the module 120 to all mobile devices 110. The server 116 periodically receives 504 from the sampling module 120 logged identifying information about files intercepted and quarantined by the module 120, where these files were transferred to one or more mobile devices 110 from other devices via file transfer mechanisms using short-range communication technology.

The server 116 determines 506 whether the files for which identifying information was received have been seen before or are known to be good or non-malware. For files that do meet this definition, the server 116 takes 507 no further action. For files that do not meet this definition (for new files or files not already known to be non-malware), the server 116 can request 508 copies of those files for further analysis. The server 116 receives 510 from the sampling module 120 the copies of the certain files requested, and analyzes 512 those files to determine whether the files are malware. The server 116 can further update 514 a reputation system for mobile devices regarding the analysis 512. For example, the reputations of files identified as malware can be included in the reputation system for use in future malware detections. In some embodiments, the server 116 also updates 514 the reputation system regarding files determined to be clean or non-malware files. The server 116 can further update 514 the reputation system regarding geographic information associated with the malware files for tracking geographic distribution patterns of mobile malware. The data obtained by the server 116 can be used to seed the reputation system for mobile malware tracking, and can be used for customizing heuristics for detecting malware, malware signature updates, security policies, etc.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer-implemented method of sampling files for malware tracking on a mobile device, the computer-implemented method comprising:
receiving a sampling module deployed to the mobile device, the sampling module performing steps comprising:
configuring file transfer mechanisms that use short-range communication technology on the mobile device to appear, to other devices, to be open for accepting attempts to transfer files;
intercepting files transferred via the short-range communication technology to the mobile device from another device;
quarantining the files transferred to the mobile device;
logging identifying information about the files quarantined and about the other devices from which the files originated, wherein logging identifying information comprises actively scanning each of the other devices from which the files originated by sending probes to elicit responses from said other devices so as to acquire identifying information about the other devices, and the identifying information logged about each of the other devices comprises a device type and an identification of ports on the other devices that are open for sharing files; and
providing the logged identifying information for the files received to a security server for malware tracking.

2. The method of claim 1, further comprising, responsive to a request from the security server for more information about one of the files, providing a copy of that file to the security server for malware analysis and for updating a reputation system tracking mobile device malware.

3. The method of claim 1, wherein the logged identifying information about each of the files comprises a physical location from which the file was obtained.

4. The method of claim 3, wherein the physical location is determined using technology selected from the group consisting of: GPS and cellular triangulation.

5. The method of claim 1, wherein logging identifying information further comprises emulating the mobile device to respond to an information gathering request from one of the other devices from which one of the files originated.

6. The method of claim 1, further comprising receiving a response from the security server, the response comprising reputation information about the files originated from the other devices.

7. A non-transitory computer-readable storage medium storing executable computer program instructions for sampling files for malware tracking on a mobile device, the computer program instructions comprising instructions for performing steps comprising:
receiving a sampling module deployed to the mobile device, the sampling module performing steps comprising:
configuring file transfer mechanisms that use short-range communication technology on the mobile device to appear, to other devices, to be open for accepting attempts to transfer files;
intercepting files transferred via the short-range communication technology to the mobile device from another device;
quarantining the files transferred to the mobile device; and
logging identifying information about the files quarantined and about the other devices from which the files originated, wherein logging identifying information comprises actively scanning each of the other devices from which the files originated by sending probes to elicit responses from said other devices so as to acquire identifying information about the other devices, and the identifying information logged about each of the other devices comprises a device type and an identification of ports on the other devices that are open for sharing files;
providing the logged identifying information for the files received to a security server for malware tracking.

8. The computer-readable storage medium of claim 7, wherein the logged identifying information about the files comprises a name of the file, a date that the file was received, and a time that the file was received.

9. The computer-readable storage medium of claim 7, wherein the logged identifying information about each of the files comprises a network medium used to send the file.

10. The computer-readable storage medium of claim 7, wherein the logged identifying information about each of the files comprises one or more peer identifiers associated with the file.

11. The computer-readable storage medium of claim 7, wherein the logged identifying information comprises information about a security configuration of the mobile device, the information selected from the group consisting of: a firewall configuration, a list of interfaces that are active on the mobile device, and a visibility of the mobile device on a short range communication network.

12. The computer-readable storage medium of claim 7, wherein the mobile device is one of a plurality of mobile devices executing a sampling module for performing the steps, each mobile device acting as a honeypot that gathers data about mobile device attackers providing malware files and submits the gathered data to the security server to seed a reputation system with data about mobile device malware.

13. A computer-implemented method of sampling files for malware tracking on mobile devices, the computer-implemented method comprising:
deploying sampling modules to a plurality of mobile devices having file transfer mechanisms using short-range communication technology, the file transfer mechanisms of the mobile devices being configured by the sampling modules to appear, to other devices, to be open for accepting attempts to transfer files;
periodically receiving, from the sampling modules, logged identifying information about a plurality of files intercepted and quarantined by the sampling modules and about the other devices from which the files originated, wherein the logged identifying information is obtained by actively scanning, by the sampling modules, the other devices from which the files originated by sending probes to elicit responses from said other devices so as to acquire identifying information about the other devices, and the logged identifying information about the other devices comprises device types and identifications of ports on the other devices that are open for sharing files;
requesting, from the sampling modules, copies of certain of the files for which logged information was received; and
analyzing the requested copies to identify the files that contain malware.

14. The computer-implemented method of claim 13, further comprising updating a reputation system for tracking mobile device malware regarding the files identified to contain malware.

15. The computer-implemented method of claim 14, wherein updating the reputation system further comprises seeding the reputation system with information about files determined to be mobile malware.

16. The computer-implemented method of claim 14, wherein the identifying information received further comprises data regarding types of locations at which the mobile devices were located when the files were received, and wherein updating the reputation system further comprises providing to the reputation system the data regarding the types of locations for tracking location type distribution patterns of mobile malware.

17. The computer-implemented method of claim 14, wherein the identifying information received further comprises data regarding geographic locations of the mobile devices, and wherein updating the reputation system further comprises providing to the reputation system geographic location information for the mobile devices on which malware was detected for tracking geographic distribution patterns of mobile malware.

18. The computer-implemented method of claim 13, further comprising applying results of the malware analysis and information collected about locations of the mobile devices to customize heuristics for detecting malware, to create malware signature updates, and to generate security policies for malware management.

19. The computer-implemented method of claim 13, wherein analyzing the requested copies further comprises executing the requested file copies in an emulator or on a virtual machine to observe whether the files exhibit malicious behavior.

* * * * *